Dec. 4, 1956     I. F. SCHRECK     2,772,797
TROLLEY TRANSFER TRUCK
Filed June 8, 1954     3 Sheets-Sheet 2
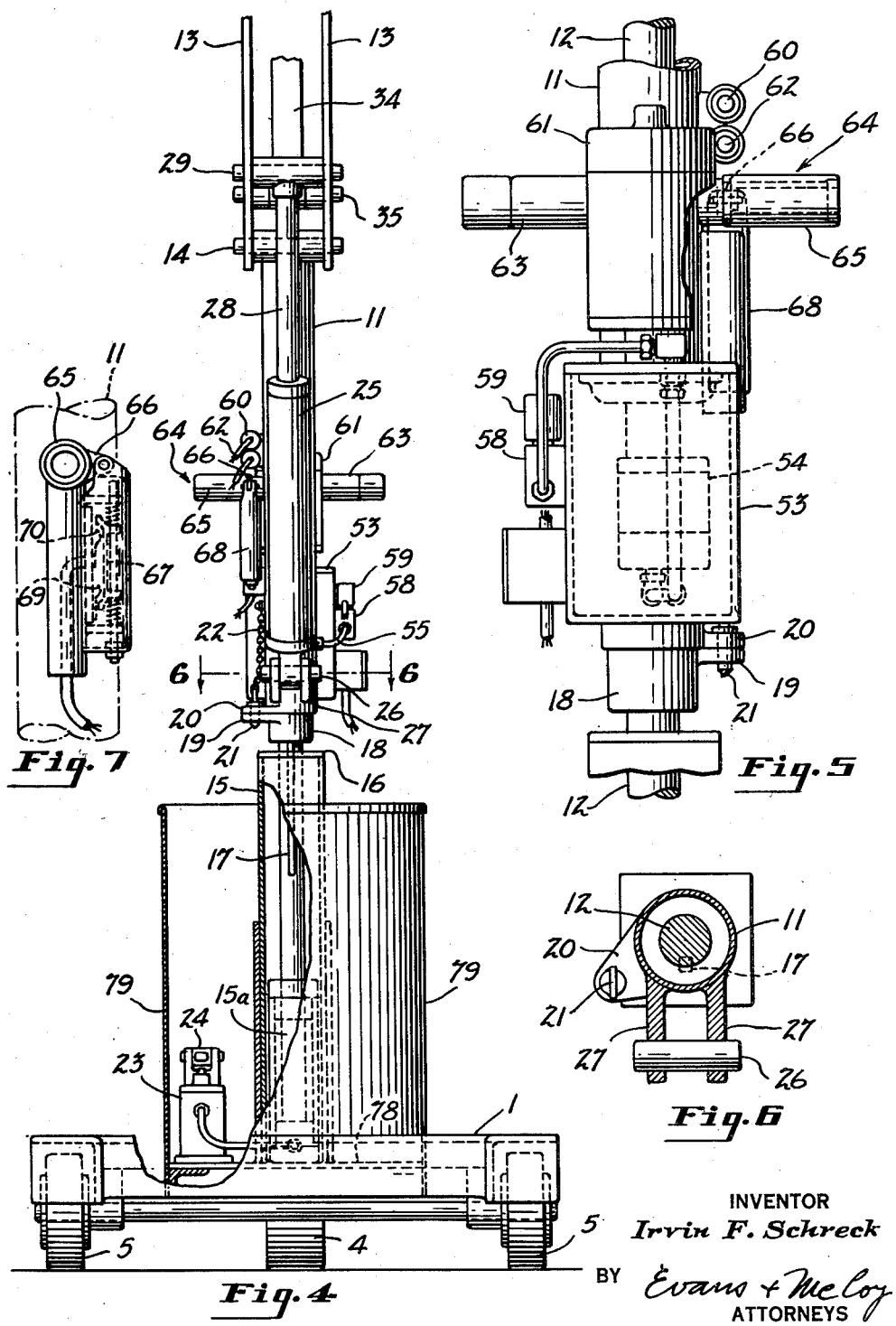
INVENTOR
*Irvin F. Schreck*
BY *Evans + McCoy*
ATTORNEYS

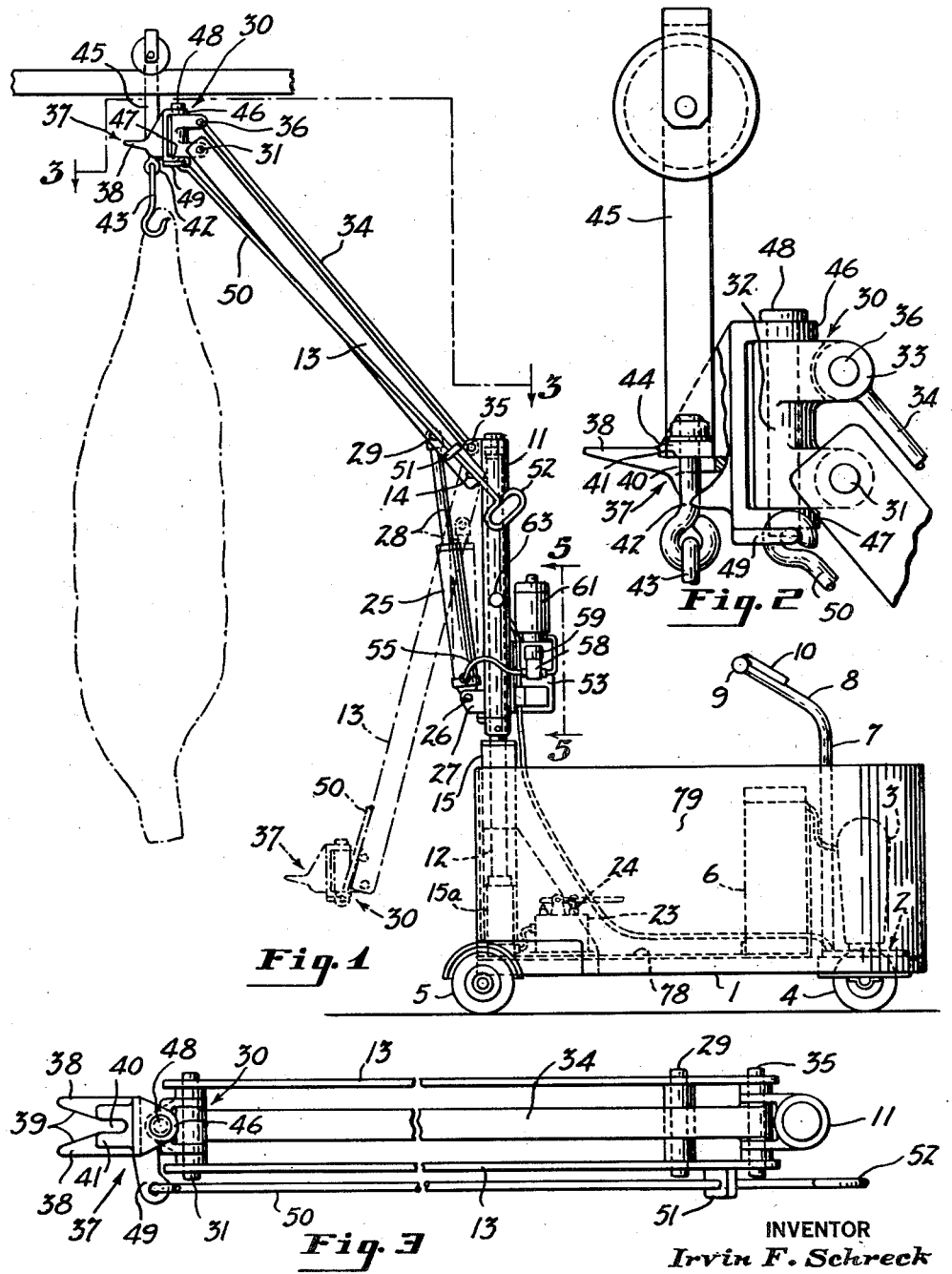

United States Patent Office 2,772,797
Patented Dec. 4, 1956

2,772,797

TROLLEY TRANSFER TRUCK

Irvin F. Schreck, South Euclid, Ohio

Application June 8, 1954, Serial No. 435,114

8 Claims. (Cl. 214—132)

This invention relates to industrial trucks and more particularly to a truck designed for transferring loaded trolleys such as are employed for supporting animal carcasses from overhead monorails in cold storage warehouses.

The truck of the present invention is a motor propelled truck having means for steering it and provided with a vertically and laterally adjustable trolley engaging member at its rear end that can be engaged with a trolley on an overhead track, that can be operated to transfer the trolley from the track to the truck, that supports the trolley and load during truck travel and that can be manipulated to facilitate the transfer of the trolley from the truck to an overhead track. The trolley engaging member is in the form of a fork at the free end of a vertically swinging boom that is pivoted to a mast mounted on the truck to turn about a vertical axis. The mast, boom and fork can be manipulated to aline the fork with a trolley on an overhead track, and the truck propelling mechanism, which is reversible, can be controlled to move the truck to engage the fork with a trolley on an overhead track to transfer the same to the truck or to disengage the fork from the trolley to transfer the trolley from the truck to the track.

The truck may be employed to transport trolleys with animal carcasses suspended therefrom to a storage room and to deposit the loaded trolley upon an overhead track or to detach loaded trolleys from their supporting tracks and transport the trolleys with the carcasses suspended therefrom.

The boom carrying mast is preferably mounted adjacent the rear end of the truck and the truck is provided with an operator's platform between the mast and a steering handle that is positioned adjacent the forward end of the truck. The steering handle is provided with a manually operable sleeve controller for the reversible truck propelling mechanism which can be turned in one direction or the other from a neutral position to cause the truck to be propelled forwardly or backwardly as desired.

A fluid pressure operating mechanism is provided for raising or lowering the boom and for holding the same in its various positions of vertical adjustment. The trolley engaging fork is pivoted to swing laterally on a swiveled bracket at the outer end of the boom that is so mounted that it supports the fork in a substantially horizontal position in all positions of vertical adjustment of the boom.

In order to enable the operator to aline the fork with a trolley or to shift a loaded trolley laterally with respect to an overhead track, the mast is provided with a laterally extending handle in position to be conveniently grasped by the operator to swing the mast. In order to enable the operator to quickly and easily advance the truck to engage the fork with a trolley or to retract the truck and disengage the fork from the trolley, the laterally extending arm on the mast is provided with a sleeve controller like that provided on the steering handle, which operates switches that are in parallel with the switches on the steering handle, so that the truck can be caused to be moved forwardly or rearwardly by means of the controller on the mast handle while a trolley is being transferred from an overhead track to the truck or from the truck to an overhead track.

The boom raising and lowering mechanism is preferably controlled by push buttons on the mast adjacent the mast turning handle, so that the boom can be quickly and easily positioned with the trolley engaging fork at the proper elevation for engagement with a trolley.

In order to facilitate the placement of a trolley on an overhead rail, the trolley engaging fork is mounted to swing laterally on its supporting bracket, and an actuating rod pivotally connected to the fork at a point laterally offset from its vertical pivot is slidably mounted on the boom and is provided with a handle that is conveniently accessible to the operator, by means of which the trolley fork can be swung laterally with respect to the boom. By means of this lateral adjustment of the fork, the operator can shift the trolley laterally to place it in vertical alinement with the track upon which it is to be placed prior to the lowering of the boom, so that the trolley can be quickly and easily deposited on its supporting track.

The invention has for its object to provide a trolley transfer truck which can be conveniently operated to transfer loaded trolleys such as carcass carriers from an overhead track to the truck or to transfer loaded trolleys from the truck to an overhead track.

Reference should be had to the accompanying drawings forming part of this specification, in which:

Figure 1 is a side elevation of a trolley transfer truck embodying the invention;

Fig. 2 is a fragmentary side elevation showing the trolley engaging and supporting fork with a trolley thereon, on an enlarged scale;

Fig. 3 is a fragmentary top plan view of the boom and trolley fork;

Fig. 4 is a fragmentary rear elevation of the truck;

Fig. 5 is a fragmentary front elevation on an enlarged scale showing the lower portion of the mast and portions of the mast adjusting mechanism carried thereby;

Fig. 6 is a fragmentary horizontal section taken on the line indicated at 6—6 in Fig. 4;

Fig. 7 is a fragmentary detail view showing the controller on the mast handle.

Figure 8:
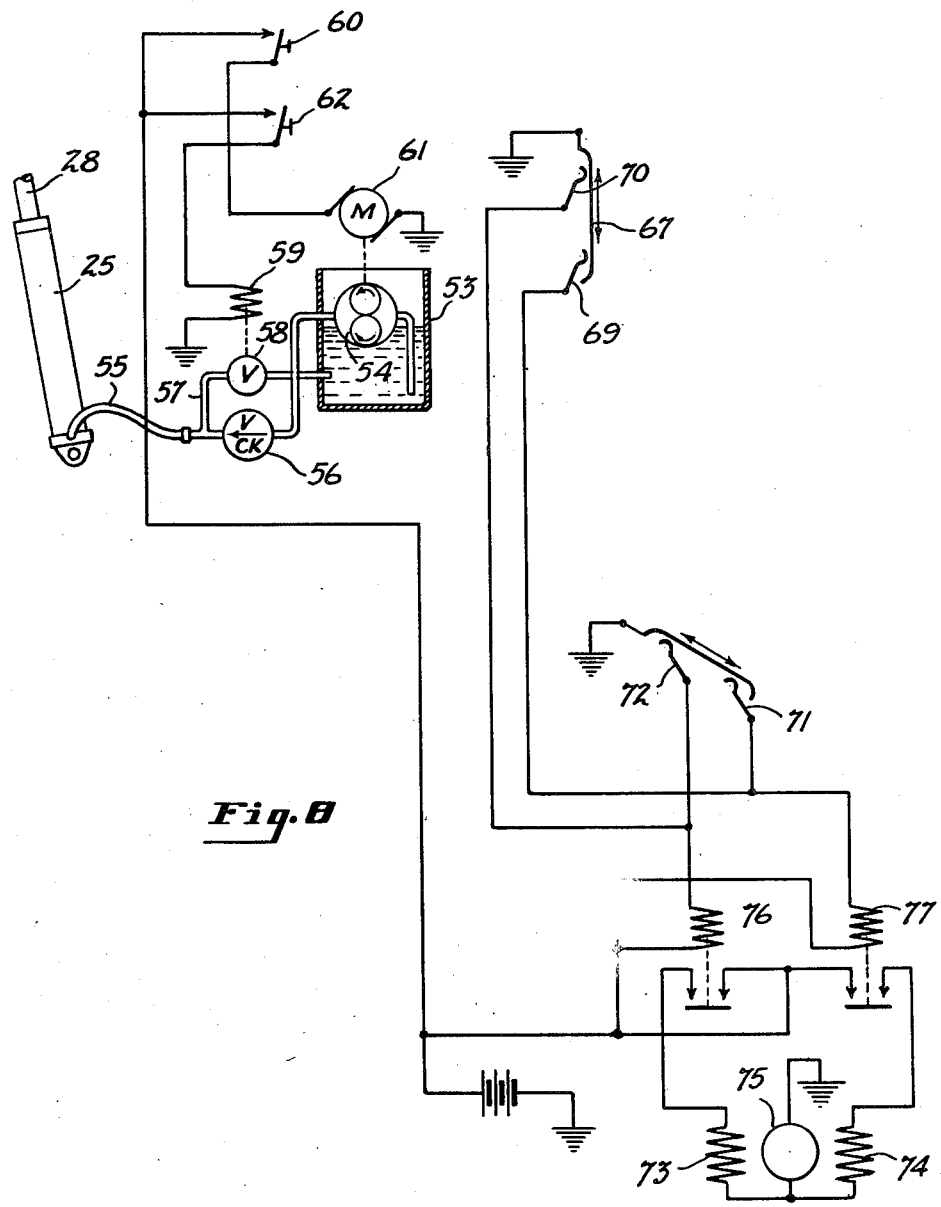
Fig. 8 is a wiring diagram showing the controlling circuits for the truck propelling motor and the boom actuating mechanism.

Referring to the accompanying drawings, the truck of the present invention has a frame 1 and a propelling unit 2 at its forward end that is swiveled in the frame to turn about a vertical axis. The propelling unit includes a motor housing 3 and a front supporting wheel 4 that serves as a traction wheel and that is turned with the propelling unit to steer the truck. The truck has a pair of laterally spaced rear wheels 5 and power is supplied by a suitable storage battery 6 mounted adjacent the forward end of the truck. A steering handle 7 projects upwardly from the propelling unit and has a rearwardly bent upper end portion 8 to which suitable hand grips 9 are attached. The hand grips 9 are in the form of rotatably mounted sleeves that turn in either direction from a neutral position to operate switches in a housing 10 which control the propelling motor to drive the truck forwardly or rearwardly. The motor controlling device may be that disclosed in my Patent 2,588,664, granted March 11, 1952.

Adjacent the rear end of the truck frame, a mast 11 in the form of a tubular sleeve is mounted to turn on a vertical post 12. The mast 11 has a boom 13 pivoted to the upper end thereof to swing on a horizontal pivot 14. The lower end of the post 12 is in the form of a plunger and is mounted in a hollow casing 15 on the frame 1 in the lower portion of which is a cylinder 15a and the post 12 is vertically adjustable in the casing 15. The casing 15 has a head 16 that is engaged by a key 17 on the post to hold the post against turning movements. The tubular mast 11 is supported on a collar 18 attached to the post and this collar has a laterally projecting flange 19 which is engaged by a flange 20 on the lower end of the mast 11. The mast may be secured against turning movement on the post when desired by means of a pin 21 that removably engages registering openings in the flanges 19 and 20 and that is attached to the mast by a suitable chain 22.

Means is preferably provided for adjusting the post 12 to raise or lower the mast with respect to the truck frame. As herein shown the post 12 is the vertically movable plunger of the cylinder 15a which is connected to a liquid reservoir 23 from which liquid is forced into the cylinder to raise the post and which receives liquid from the cylinder when the post is lowered, a conventional hydraulic jack pump and valve unit 24 being employed to force liquid into the cylinder 15a and to drain liquid therefrom.

Fluid pressure actuated mechanism is employed for raising and lowering the boom and for holding the boom in any position of vertical adjustment. This mechanism includes a cylinder 25 connected at its lower end by a horizontal pivot 26 to a bracket 27 formed integrally with the mast 11. The cylinder 25 has a piston 28 that projects upwardly therefrom and that is connected by a horizontal pivot 29 to the boom 13 a short distance outwardly of the boom pivot 14. The length of the cylinder 25 and piston 28 is such that when the piston 28 is in retracted position the boom extends downwardly from the upper end of the mast at a small angle to the mast. When the piston 28 is extended the boom 13 projects upwardly beyond the top of the mast as shown in Fig. 1.

At the outer end of the boom 13 a supporting bracket 30 is connected to the boom by a horizontal pivot 31. The bracket 30 has a tubular bearing portion 32 that is disposed at right angles to the pivot 31 and this bracket has a parallel link connection to the mast which serves to hold the bearing portion 32 in vertical position in all positions of the boom 13. The bracket 30 has an inwardly projecting arm 33 that is connected by a tension member or link 34 to the mast 11. The link 34 is disposed substantially parallel to the boom 13 and is connected at its inner and outer ends by horizontal pivots 35 and 36 to the mast and to the inwardly extending arm of the bracket 30. The pivots 35 and 36 are positioned directly above the boom pivot 14 and the bracket pivot 31 and at substantially equal distances from these pivots, so that a parallel link support is provided for the bracket 30. The bracket 30 provides a support for a trolley engaging fork 37 that has spaced projecting arms 38 with beveled portions 39 at their outer ends which serve to guide a trolley into a narrow slot 40 in a recessed portion 41 of the fork where the trolley is supported while it is being transported by the truck.

As shown herein, the trolley engaging fork is designed to engage with an eyebolt suspension member 42 to which a carcass engaging hook 43 is attached. The suspension bolt 42 may be attached to a horizontal flange 44 at the lower end of a trolley strap 45 that is adapted to seat in the recess 41 as shown in Fig. 2 of the drawings. The fork 37 has upper and lower flanges 46 and 47 which engage the upper and lower ends of the tubular portion 32 of the supporting bracket and is pivotally connected to the bracket by means of a vertical pivot pin 48 that extends through the flanges 46 and 47 and the tubular bearing portion 32 of the supporting bracket.

The mounting of the trolley engaging fork to swing laterally about a vertical axis enables the operator to impart a slight lateral movement to a loaded trolley supported on the fork to aline the wheel of the trolley with an overhead supporting track before the boom is lowered to transfer the trolley from the truck to the track or while the boom is being lowered. The lateral adjustment of the fork is effected by an actuating rod 50 that is pivoted to a laterally extending arm 49 fixed to the fork, the rod 50 being slidably mounted in a bracket 51 attached to the boom. The rod 50 extends past the inner end of the boom 13 and is provided with a handle 52 at its inner end which is conveniently accessible to an operator on a truck for adjusting the fork.

Liquid under pressure to lift the boom is supplied to the cylinder 25 from a storage tank 53 mounted on the mast 11. A pump 54, as shown in Fig. 8, delivers liquid under pressure from the tank 53 to the cylinder 25 through a pipe 55. The pipe 55 is provided with a check valve 56 which prevents return flow to the tank through the pipe 55, so that the boom will be held by the liquid in the cylinder 25 in any position of vertical adjustment which it occupies when the pump 54 is stopped. The lowering of the boom is accomplished by permitting flow of liquid from the cylinder 25 to the tank 53 through a bypass 57 that is connected to a tank and to the pipe 55 between the check valve 56 and the cylinder 25. The bypass 57 has a normally closed valve 58 that is adapted to be opened by means of a solenoid 59 to permit flow of liquid through the bypass 57 from the cylinder 25 to the tank 53. A pushbutton 60 on the mast controls a motor 61 for driving the pump 54. A pushbutton 62 on the mast serves to energize the solenoid 59 to open the bypass valve 58. The boom is raised by holding the pushbutton switch 60 in closed position until the boom is raised to the desired position, whereupon the switch 60 is released and permitted to open to stop the motor 61 and pump 54. In lowering the boom the pushbutton switch 62 is closed and held closed until the boom is lowered to the desired position, when it is released to allow the bypass valve 58 to close.

To enable the operator to manipulate the mast and boom while a loaded trolley is being transferred to or from an overhead track, the mast has opposite laterally projecting handles 63 and 64 attached thereto, the handle 64 having a controller sleeve 65 rotatably mounted thereon. The sleeve 65 is normally held in a neutral position and can be turned in either direction from that neutral position to actuate an arm 66 projecting from the sleeve and connected to a switch member 67 in the switch housing 68 attached to the mast. The switches in the housing 68 correspond to the motor controlling switches in the steering handle housing 10 and serve to control the propelling motor to move the truck forwardly or rearwardly.

As shown in Fig. 8, the switch member 67 energizes switches 69 and 70 that are disposed and parallel with switches 71 and 72 in the housing 10. Forward and reverse windings 73 and 74 of a propelling motor 75 are controlled by solenoids 76 and 77 that are energized by either of the switches 69 or 71 and either of the switches 70 or 72, respectively.

The truck frame 1 has an operator's platform 78 that is disposed between the supporting mast 11 and the steering handle 7 so that an operator on the platform can drive and steer the truck, employing the controller on the handle 7 to energize the propelling motor in the proper direction and utilizing the steering handle to steer the truck. When transferring a trolley from the track to the truck, or from the truck to a track, the operator faces the mast and operates the pushbuttons 60 and 62 to position the boom and the handles 63 and 64 to swing the boom laterally, the controller 65 on the handle 64 enabling the operator to advance or retract the truck to quickly engage the fork with a trolley or to disengage the fork from the trolley. The steering handle 7 is so positioned that the operator may stand with his back against it to hold the wheel 4 against swiveling movements while the truck is being advanced or retracted by means of the controller 65.

During travel of the truck the mast may be locked against turning movements by means of the pin 21 which can be readily released whenever it is desired to manipulate the mast. The truck body may be provided with side walls 79 which serve to prevent the clothes of the operator coming in contact with carcasses in a storage room during travel of the truck.

It is to be understood that in accordance with the provisions of the patent statutes, variations and modifications of the specific devices herein shown and described may be made without departing from the spirit of the invention.

What I claim is:

1. In a trolley transfer truck having a steering means and a reversible propelling mechanism, the combination therewith of a mast mounted on said truck to turn about a vertical axis, an operator's platform adjacent the base of said mast, a boom pivoted to said mast to swing about a horizontal axis, a trolley engaging fork pivoted to said boom at its outer end for lateral swinging movements, manually controlled means for raising and lowering said boom and holding it in adjusted position, and a manually operable actuating member attached to said fork and extending along said boom to within reach of the operator on said platform for swinging said fork laterally on said boom to aline a trolley carried by said fork with an overhead track.

2. In a trolley transfer truck having a steering means and a reversible propelling mechanism, the combination therewith of a mast mounted on said truck to turn about a vertical axis, an operator's platform adjacent the base of said mast, a boom pivoted to said mast to swing about a horizontal axis, a trolley engaging fork pivoted to said boom at its outer end for lateral swinging movements, manually controlled means for raising and lowering said boom and holding it in adjusted position, means for automatically holding said fork substantially in a horizontal position in all positions of adjustment of the boom, and a manually operable actuating member attached to said fork and extending along said boom to within reach of the operator on said platform for swinging said fork horizontally.

3. In a truck for transferring trolleys that travel on overhead tracks and that have downwardly extending load suspension bolts, said truck having a steering means and a propelling mechanism, the combination therewith of a mast mounted on said truck to turn about a vertical axis, a boom pivoted to the upper end of said mast to swing vertically, means for raising and lowering said boom, a trolley engaging fork carried by said boom at its outer end, said fork having a narrow suspension bolt receiving slot and arms with beveled inner edges for guiding a suspension bolt into said slot, and means for maintaining said fork in substantially horizontal position in all positions of said boom.

4. In a trolley transfer truck having a steering means and a propelling mechanism, the combination therewith of a mast mounted on said truck to turn about a vertical axis, a boom pivoted to the upper end of said mast to swing vertically, means for raising and lowering said boom, a bracket pivoted to the outer end of said boom to swing about a horizontal axis, a trolley engaging fork, a pivot disposed at right angles to said fork and to the pivotal axis of said bracket and connecting said fork to said bracket, means for holding said fork in substantially horizontal position in all positions of the boom comprising a link connecting said bracket to said mast and disposed substantially parallel to said boom, and manually operable means for swinging said fork horizontally about its pivot.

5. In a trolley transfer truck having a steering means and a propelling mechanism, the combination therewith of a mast mounted on said truck to turn about a vertical axis, a boom pivoted to the upper end of said mast to swing vertically, means for raising and lowering said boom, a bracket pivoted to the outer end of said boom to swing about a horizontal axis, a trolley engaging fork having a laterally extending arm, a pivot connecting said fork to said bracket and disposed at right angles to said horizontal axis and at right angles to said fork, means for holding said pivot in substantially vertical position in all positions of the boom comprising a link connecting said bracket to said mast and disposed substantially parallel to said boom, and an actuating rod slidably mounted on said boom and pivoted to said laterally extending arm.

6. In a trolley transfer truck having a steering means and a propelling mechanism, the combination therewith of a mast mounted on said truck to turn about a vertical axis, a boom pivoted to the upper end of said mast to swing vertically, means for raising and lowering said boom, means for adjusting said mast vertically, a trolley engaging fork pivotally connected to the outer end of said boom for lateral swinging movements, means for swinging said fork laterally, and means for maintaining said fork in substantially horizontal position in all positions of vertical adjustment of said boom.

7. In a trolley transfer truck having steering means and a reversible propelling mechanism, the combination therewith of a mast mounted on said truck to turn about a vertical axis, a boom pivoted to the upper end of said mast to swing vertically, fluid pressure operated means for raising and lowering said boom and for holding the same in adjusted positions, a trolley engaging fork pivotally mounted on the end of said boom to swing laterally with respect to said boom, means for maintaining said fork in substantially horizontal position in all positions of vertical adjustment of said boom, a laterally projecting handle on said mast by means of which an operator may turn said mast and boom about the vertical axis of the mast, a hand grip mounted on said handle to turn in opposite directions from a neutral position, means operated by said hand grip for controlling said propelling mechanism to propel the truck forwardly or rearwardly, manually operable controllers for said fluid pressure operated means mounted on said mast adjacent said handle, and an actuating member connected to said fork and extending to said mast for adjusting said fork angularly with respect to said boom.

8. In a trolley transfer truck having steering means and a reversible propelling mechanism, the combination therewith of a mast mounted on said truck to turn about a vertical axis, a boom pivoted to the upper end of said mast to swing vertically, fluid pressure operated means for raising and lowering said boom and for holding the same in adjusted positions, a trolley engaging fork pivotally mounted on the end of said boom to swing laterally with respect to said boom, means for maintaining said fork in substantially horizontal position in all positions of vertical adjustment of said boom, means for swinging said mast and boom about said vertical axis, means for locking said mast against turning movements about said axis, manually operable means extending from said fork to said mast for swinging said fork laterally with respect to the boom, and controllers for said propelling mechanism and said pressure operated means mounted on said mast.

References Cited in the file of this patent

UNITED STATES PATENTS

| | | |
|---|---|---|
| 308,118 | Whitcomb | Nov. 18, 1884 |
| 1,051,780 | Terril et al. | Jan. 28, 1913 |
| 2,209,356 | Schreck | July 30, 1940 |
| 2,605,008 | Schroeder | July 29, 1952 |
| 2,646,182 | Maas | July 21, 1953 |
| 2,674,385 | Stauth et al. | Apr. 6, 1954 |